(12) United States Patent
Bergmann

(10) Patent No.: US 7,204,178 B2
(45) Date of Patent: Apr. 17, 2007

(54) POWER CUTTING SAW WITH DUST CATCHING DEVICE

(75) Inventor: Laurenz Bergmann, Haren/Ems (DE)

(73) Assignee: Metabowerke GmbH, Nuertingen (DE)

( * ) Notice: Subject to any disclaimer, the term of this patent is extended or adjusted under 35 U.S.C. 154(b) by 170 days.

(21) Appl. No.: 11/034,716

(22) Filed: Jan. 14, 2005

(65) Prior Publication Data

US 2005/0160892 A1    Jul. 28, 2005

(30) Foreign Application Priority Data

Jan. 22, 2004    (DE) .................. 20 2004 000 983 U

(51) Int. Cl.
  *B26D 7/18* (2006.01)
  *B27B 5/29* (2006.01)
(52) U.S. Cl. ............................. 83/162; 83/100; 83/490
(58) Field of Classification Search .................. 83/100, 83/471.3, 472, 473, 483, 485, 581, 162, 163, 83/165, 168
See application file for complete search history.

(56) References Cited

U.S. PATENT DOCUMENTS

| 2,399,239 | A |   | 4/1946 | Martin |
| 2,425,331 | A | * | 8/1947 | Kramer ........................ 83/478 |
| 2,996,824 | A | * | 8/1961 | Faycosh ......................... 43/16 |
| 3,322,169 | A | * | 5/1967 | Hilliard ........................ 83/100 |
| 3,401,724 | A |   | 9/1968 | Kreitz |
| 3,882,598 | A |   | 5/1975 | Earle et al. |
| 5,782,153 | A | * | 7/1998 | Sasaki et al. .................. 83/162 |
| 5,927,171 | A |   | 7/1999 | Sasaki et al. |
| 5,931,072 | A |   | 8/1999 | Shibata |
| 6,510,772 | B2 |  | 1/2003 | Brickner, Jr. et al. |
| 6,742,425 | B2 |  | 6/2004 | Oktavec et al. |
| 2002/0104416 | A1 | | 8/2002 | Brickner, Jr. et al. |

FOREIGN PATENT DOCUMENTS

| DE | 23 47 256 B1 | 1/1975 |
| DE | 100 36 426 A1 | 6/2001 |
| EP | 1 266 720 A2 | 12/2002 |
| JP | 3-108401 | 11/1991 |
| JP | 3-112301 | 11/1991 |
| JP | 7-276302 | 10/1995 |
| JP | 11170214 | * 6/1999 |

* cited by examiner

*Primary Examiner*—Stephen Choi
(74) *Attorney, Agent, or Firm*—David S. Safran

(57) ABSTRACT

Cutting saw with a workpiece supporting surface, a holder mounted on the carrier, a saw assembly, having a motor and saw blade, being pivotably attached to the holder above the carrier, and a dust catching device mounted on the saw assembly. The saw assembly can pivot around a transverse axis out of a raised rest position into a lowered sawing position. The dust catching device has at least one dust outlet opening on a dust outlet side and has at least one dust inlet opening which faces a dust-throwing side of the saw blade on a dust inlet side. It is proposed that the dust catching device be made of a flexurally stiff material on at least the dust inlet side and that at least a part of the dust catching device is movable at least on the dust inlet side.

10 Claims, 3 Drawing Sheets

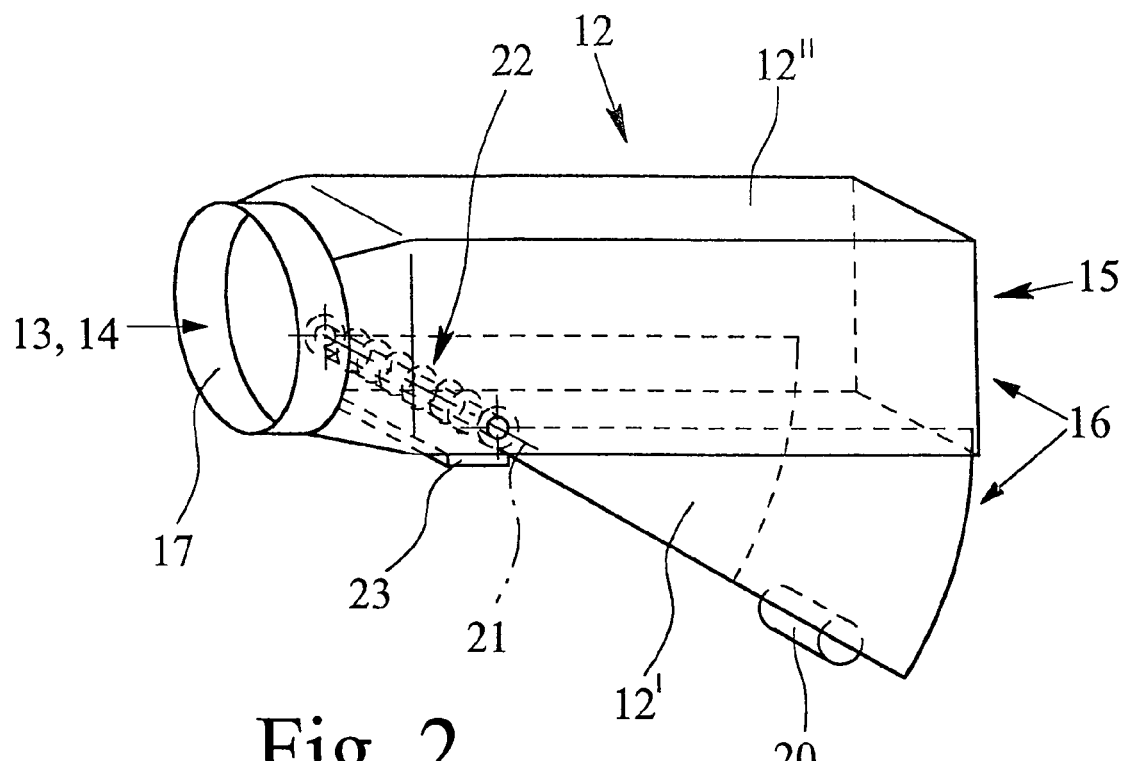
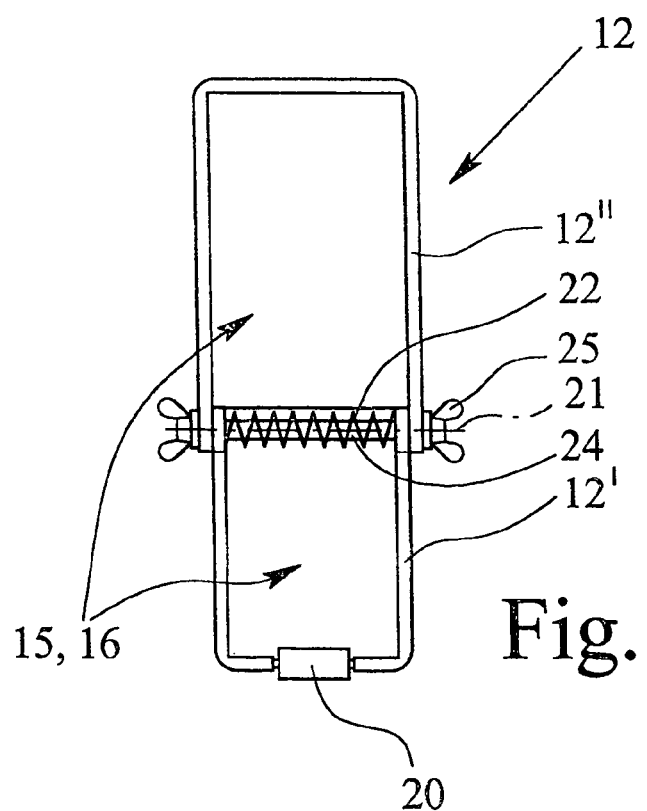

POWER CUTTING SAW WITH DUST CATCHING DEVICE

BACKGROUND OF THE INVENTION

1. Field of Invention

The invention relates to a power cutting saw with a dust catching device with a carrier which forms a workpiece supporting surface, a holder which is mounted on the carrier, a saw assembly which is pivotably attached to the holder to pivot around a transverse axis above the carrier, the saw assembly having a drive motor and a saw blade, and being pivotable between a rest position in which the saw blade is raised and a sawing position in which the saw blade is lowered, and a dust catching device which is mounted on the saw assembly, the dust catching device having at least one dust outlet opening on a dust outlet side and having at least one dust inlet opening on a dust inlet side, the at least one dust inlet opening facing a dust-throwing side of the saw blade.

2. Description of Related Art

Saws of the type under consideration have been known for decades (German Patent Application DE 197 31 436 A1; European Patent Application EP 1 266 720 A2). They are used for working all types of materials. One special application of these power saws is woodworking and others are for working plastic and for metalworking.

The particular type of power saw to which the present invention is directed, i.e., a cutting saw, first of all, has a saw assembly which is mounted to be able to pivot around a transverse axis, its saw blade being mounted to pivot out of a raised rest position into a lowered sawing position and vice versa. With this motion of the saw blade, a workpiece located on a workpiece supporting surface can be cut off.

SUMMARY OF THE INVENTION

Cutting saws of the type under consideration are generally equipped such that they can also make miter cuts. To do this, the workpiece supporting surface is then located in whole or in part on a workpiece supporting table which is mounted on a carrier and which is supported to be able to turn around a vertical axis; on the edge of the table a holder for the saw assembly is attached. The workpiece supporting table can be turned to the left and right relative to the carrier with a contact rail mounted preferably on the latter for the workpiece. Thus, a workpiece can be cut off not only at an angle of 90° but also, for example, also at an angle of 45° (miter cut).

Furthermore, cutting saws are often equipped with a further pivoting capacity, specifically such that the holder has a tilt arrangement with which the saw assembly can be pivoted relative to the carrier or the workpiece supporting surface around a lengthwise axis which runs essentially at a right angle to the transverse axis and which lies in or parallel to the plane of the workpiece supporting surface. This allows miter cuts in a plane which is perpendicular to the plane described previously and double mitre cuts (bevel cuts).

Providing cut and miter-cut saws with a pulling function is also known. A pulling function in the lengthwise direction leads to the length of the cut made by the cutting saws being longer than results from the diameter of the saw blade. The saw blade cuts through the workpiece not only as a result of the pivoting motion around the transverse axis, by also as a result of the displacement motion perpendicular to the transverse axis, therefore in the lengthwise direction. They are then combined cut, mitre-cut and pit saws. They are especially known with a workpiece supporting table of small diameter which has a radial arm with a plunge slit which runs in it in the lengthwise direction.

It is common to all the above described and also other possible versions of cutting saws that, in the course of the sawing process, a considerable amount of sawdust is formed and is deposited on the workpiece which is being machined, the cutting saw which is in operation, and the entire nearby work environment. The saw blade thus rotates in a given, invariable direction of rotation, the oppositely set saw teeth cutting shavings off the workpiece which are then transported out of the saw notch through the cavities, which are called gashes, between the saw teeth which are arranged in succession. The sawdust leaves the saw blade at a comparatively highly spread scattering angle, the main ejection direction being defined by a tangent to the point of the saw blade at which the saw blade comes into contact with the workpiece and at which material removal occurs extensively and at which the saw blade leaves the workpiece. The material which is not thrown out of the saw notch in the above described main ejection direction is scattered mainly in the plane of space defined by the saw blade, but also slightly deviating from this plane.

In addition to the fundamentally unwanted effect of fouling of the work environment, the massive deposition of sawdust on the workpiece to be machined, however, complicates or prevents mainly optical monitoring of the sawing process; under certain circumstances this has an adverse effect on the economy and safety of work.

This defect is managed in the prior art by various measures, especially by blowing away and/or extracting the sawdust from the area of the saw cut.

In this respect, a dust collection system for miter-cut saws is known (German Patent Application DE 100 36 426 A1) in which a collector is mounted on the saw assembly and in the sawing position of the miter-cutting saw fits securely into a recess of the workpiece supporting table, and thus, can take up the sawdust found in the vicinity of the collector at a fixed, invariable position.

A circular saw with improved dust catching is also known (German Patent Application DE 197 31 436 A1) in which a dust catching nozzle which is integrated into the holder of the saw assembly partially encompasses the saw blade radially from the inside to the outside, and thus, catches mainly the sawdust which is entrained with the saw blade, without, however, being able to keep the workpiece free of sawdust in a particular manner.

In other known approaches, a duct catching device is not mounted on the pivoting saw assembly, but on the carrier or the optional rotary workpiece supporting table such that the opening of the dust catching device is located at a short height over the workpiece supporting table; in any case, at some distance from the saw blade itself (see, for example, Metabo Gesamtkatalog 2003/2004, cutting saw and miter-cut saws of type KGS 16-300 or KGS E 1670 S-Signal).

The described constructions are suited for collecting and diverting sawdust which has been thrown some distance away, but the dust collection capacity in the vicinity of the saw cut is only limited as a result of the comparatively great distance from the location of the actual cutting process.

One approach to improving the dust collection capacity in the vicinity of the workpiece is disclosed relative to the cutting saw with the dust catching device European Patent EP 1 266 720 A2 and corresponding U.S. Pat. No. 6,742,425, with respect to which the present invention represents a further development. Here, a dust catcher mounted on the housing of the pivoting saw assembly has a lower dust catching flap of elastic material. The dust catching flap is located directly behind the saw blade, and for a relatively tall workpiece optionally rests on this workpiece. One possible disadvantage of the described arrangement is, among others, that an easily movable and flexible dust catching flap, which is made, preferably, of rubber-coated fabric, for example, neoprene-coated nylon is exposed to considerable wear. Moreover, the action of a connected extraction device can be limited by the fact that the opposing sides of the dust catching flap, upon contact with the workpiece, do not fold away from one another, but toward one another, and thus, greatly diminish the extraction performance. Finally, the air flow which has been produced by a extraction device itself can lead to the flexible walls of the dust catching flap approaching one another and closing the dust catching opening. If this is counteracted (as proposed in EP 1 266 720 A2 and corresponding U.S. Pat. No. 6,742,425) by stiffening of the dust catching flap with a wire loop, the dust catching flap can no longer be suitably matched to the workpiece, so that the advantage of the originally flexible flap construction is lost.

SUMMARY OF INVENTION

It is an object of this invention is to embody and develop a cutting saw with a dust catching device such that the dust collecting action is improved, especially in the vicinity of the saw cut and the aforementioned disadvantages are avoided.

The aforementioned object is achieved in a cutting saw with the features mentioned initially above by the dust catching device on the dust inlet side is made of a flexurally stiff material and at least one part of the dust catching device is movable at least on the dust inlet side.

For implementing the teaching of the present invention nothing is required by the basic function of the cutting saw. The miter function, bevel-cutting function and pulling function can each be present, but need not be.

The basic idea of the invention is that a dust catching device which is mounted on the saw assembly of a cutting saw is equipped partially, and at least on its dust inlet side, in a movable manner such that a dust inlet opening which is provided in the dust inlet side can be positioned both in the vicinity of the workpiece to be worked and also in the vicinity of the saw blade, and thus, the cutting point. Here, the described movable part of the dust inlet side in which there is a dust inlet opening is, in accordance with the invention, a flexurally stiff material which meets the increased strength requirements as a result of possible contact with the workpiece and as a result of which the sawdust which can be taken up or captured with high speed.

Moreover, the flexurally stiff execution of the movable part of the dust inlet side not only has the advantage of increased wear resistance, but also the advantage that unintentional narrowing of the dust inlet opening or the entire dust inlet side by a kinking or suction action is not possible.

The movable part of the dust catching device—especially the dust inlet side of the dust catching device—is preferably movably supported in the plane which is defined by the saw blade. This mobility makes it possible to position the dust inlet side or the dust inlet opening provided in it such that it comes to rest behind the saw blade in the direct ejection area of the cutting site—therefore, the line of contact of the saw blade and workpiece—and at the same time, in the vicinity of the workpiece which is to be worked. The movable part of the dust catching device is preferably made such that it also rests on workpieces of low height with its bottom so that sawdust which has been deposited directly on the workpiece can be effectively extracted, but the sawdust which has been thrown away by the motion of the saw blade near the workpiece surface is prevented from passing through under the extraction device without being caught.

The movable part of the dust catching device is made especially such that, during the entire working motion of the saw blade, it rests on the workpiece which is to be cut. Here, it must be taken in to account that the saw assembly of cutting saws can conventionally be pivoted by means of an actuating handle around a transverse axis and the working motion consists in pivoting the saw assembly down onto the workpiece which is to be worked, from the saw blade's making contact with the workpiece, via the penetration of the saw blade into the workpiece as far as to the lower stop position of the saw assembly—the sawing position of the cutting saw—in which the saw blade has completely penetrated the workpiece and is moving with its periphery in the plunge slit of the workpiece supporting table intended for this purpose.

The movable part of the dust catching device, preferably during the lowering of the saw assembly and during penetration of the saw blade into the workpiece, touches the workpiece surface, and consequently, yields to the lowering motion of the saw assembly. Here, depending on the construction of the movable part of the dust catching device, it is possible for the supporting surface, edge or point of the dust inlet side on the workpiece to move in the above described working motion of the saw assembly and saw blade on the workpiece surface. In order to reduce the resistance which acts against this relative motion between the dust inlet side of the dust catching device and the workpiece surface, in the area of the potential support site of the dust inlet side of the dust catching device, there is a sliding or rolling element which supports easy sliding or rolling of the dust inlet side of the dust catching device on the workpiece. This is especially advantageous when the cutting saw executes not only vertical working motion, but also horizontal motion, as accompanies expanded use of the cutting saw as a pit saw, as functionally necessary.

In particular, there are now several possibilities for embodying and developing the cutting saw in accordance with the invention. In this respect, reference is made both to the description of the embodiments of the cutting saw of the invention shown in the drawings.

BRIEF DESCRIPTION OF THE DRAWINGS

FIG. 2 is a perspective of the dust catching device of a cutting saw of the invention, FIG. 3 is a side view of a dust catching device of FIG. 2 viewed in the direction toward the dust inlet side.

DETAILED DESCRIPTION OF THE INVENTION

Simply, the presence of a cutting saw is the prerequisite for achieving this object. The saw which is known in the prior art and which forms the starting point for the teaching of this invention is a combined cut and pull saw. The embodiment of the cutting saw of the invention is also such a saw configured in a versatile manner. This changes nothing in this not being an essential prerequisite for the implementation of the teaching.

Figure 1:
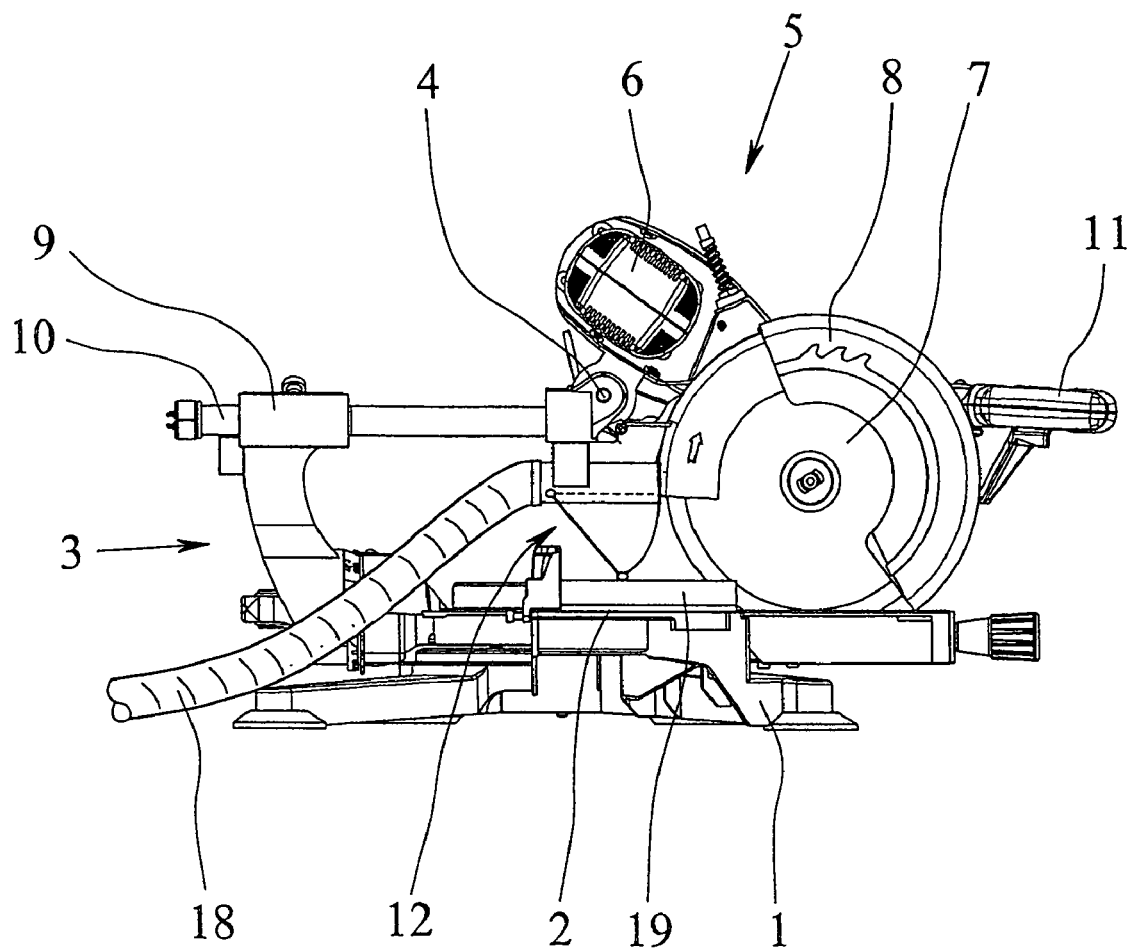
FIG. 1 is a schematic side view of the cutting saw in accordance with the invention.

The inventive saw in not limited to the sawing of wood, specifically of a board, as the workpiece 19 is shown in FIG. 1, the other materials named initially in the "Background" part of the specification can likewise be worked, if a corresponding saw blade which is suited to the material is used.

The cutting saw shown in FIG. 1 has, first of all, a carrier 1, the top side of which forms the workpiece supporting surface 2. A holder 3 is mounted on the carrier. Above the carrier 1, a saw assembly 5 is pivotably attached to the holder 3 in a manner enabling it to pivot around a transverse axis 4. The saw assembly 5 comprises a drive motor 6 and a saw blade 7 which is driven by the drive motor 6 via gearing which is not shown. The saw blade 7 is protected by a protective hood 8. In addition to the pivoting motion which the saw assembly 5 can execute around the transverse axis 4, it is also possible to linearly move the saw assembly 5 horizontally. Here, the direction of motion is fixed by a guide 9 which is located on the top end of the holder 3 and in which one or more tie rods 10 are slidably received. By applying forces to the actuating handle 11, the described movements of the saw assembly 5 can be induced.

On the saw assembly 5, a dust catching device 12 is mounted (FIG. 2) which is a separate module in the dismounted state. The dust catching device 12 has a dust outlet opening 14 on its dust outlet side 13 and has a dust inlet opening 16 on its dust inlet side 15. The dust outlet opening 14 is preferably formed by a connecting sleeve 17 to which an extraction hose 18, which is shown in FIG. 1, can be attached and which is conventionally joined to an extraction device (not shown) and which produces a strong air flow which is directed from the dust inlet side 15 to the dust outlet side 13.

It is important for all of the preferred embodiments shown in FIGS. 1 to 5 that the dust catching device 12 is made flexurally stiff on the dust inlet side 15 in order to prevent unwanted deformation of the dust catching device 12, especially of the dust inlet side 15 and the dust inlet opening 16, which deformation narrows the flow cross section.

As FIGS. 1 to 5 show, the dust catching device 12 is made moveable in part (FIGS. 1–3) or almost as an entire module (FIGS. 4 & 5), the greatest mobility prevailing in the direction of the dust inlet side 15. FIG. 1 shows that the dust catching device 12, especially the dust inlet opening 16, is located directly in the ejection area of the saw blade 7, therefore in the immediate vicinity of the contact point of the rotating saw blade 7 with the workpiece 19 which is to be cut in the plane which is defined by the saw blade 7 itself. The dust catching device 12 or the moveable part 12' of the dust catching device 12, preferably, can move in this plane.

The described dust catching device 12 can be made as a separate module from the cutting saw, or can be formed as an integral unit with the cutting saw, especially with the saw assembly 5. Here, the construction in accordance with the invention can also be combined with the extraction devices known in the art by part of the exhausted air flow fundamentally collecting dust particles which are taken into the protective hood 8 of the saw blade 7 and another part of the air flow is routed through the movable part of the dust catching device 12. FIG. 2 shows these two air flow paths or openings, the upper dust inlet opening 16 extracting the sawdust located under the protective hood 8 via the stationary part 12" of the dust catching device 12 and the lower dust inlet opening 16 of the movable part 12' of the dust catching device 12 being responsible for extracting the sawdust on the workpiece 19 and in the area of the saw cut.

As a result of the free mobility of the dust catching device 12 or of part 12' of the dust catching device 12, it is now possible to position especially the dust inlet opening 16 of the dust inlet side 15 during the entire sawing process in the vicinity of the workpiece 19 and of the saw blade 7 and thus in the direct ejection area of the sawdust.

The movable part of the dust catching device 12 is, in the unloaded state, for example, in the rest position of the cutting saw with the saw blade 7 raised, in a position which is deflected as far as possible toward the workpiece 19 located under it. When the saw assembly 5 is lowered, the saw blade 7 and the movable part 12' of the dust catching device 12 approach the workpiece 19, as the movable part 12' of the dust catching device 12 approaches the workpiece 19, it makes contact with the workpiece 19, preferably before the saw blade 7. When the saw blade 7 penetrates into the workpiece 10, the saw assembly 5 including the dust catching device 12 approaches the workpiece 19 closer and closer and the part 12' of the dust catching device 12 or the dust inlet side 15 of the dust catching device 12, which part can moved in the plane of the saw blade 7, is pressed essentially vertically up by the counterpressure exerted by the workpiece 19.

The movable part 12' of the dust inlet side 15 which is shown in FIGS. 1 to 3, in the side view shown in FIGS. 1 & 2, has the cross section of a circular segment and touches the essentially flat workpiece 19 with one edge. This edge is preferably provided with a rolling element 20 which facilitates movement of the movable part 12' of the dust inlet side 15 on the surface of the workpiece 19. In the pivoting support of the movable part 12' of the dust catching device 12 shown in FIGS. 1 to 5, this relative motion results from the essentially vertical motion of the saw assembly 5, and thus, of the dust catching device 12 when the saw blade 7 penetrates into the workpiece 19. The sliding or rolling element 20, which is shown in all figures as a roller, thus prevents possible wedging of the movable part 12' of the dust catching device 12 with the workpiece 19 when the saw assembly 5 is lowered into the sawing position.

Based on the arrangement of the saw blade 7 and the dust catching device 12 relative to one another as shown in FIG. 1, it is not possible in the proper use of the cutting saw for the sliding or rolling element 20 to penetrate into the saw cut of the workpiece 19 or to jam in it. However, the sliding or rolling element 20 should preferably be made such that this jamming is fundamentally not possible, especially not even when the cutting saw is being improperly used. This can be ensured especially by the sliding or rolling element 20 being made wider than the cut width which is determined by the thickness of the saw blade 7. Moreover, the sliding or rolling element 20 is especially so wide that it does not end up in the plunge slit of the workpiece supporting table for the saw blade (not shown) and cannot possible jam there.

The preferred embodiments of a cutting saw and especially of the dust catching device 12 which are shown in FIGS. 1 to 5 have the advantage that the dust catching device 12 closes the distance between the workpiece and the saw assembly on the dust-throwing side of the saw blade 7 not only during the entire sawing process, which is executed essentially vertically, and extracts dust (cutting saw function), but also in the horizontally executed cutting direction, therefore when using the saw as a pull saw, and even when the workpiece 19 is highly profiled. In this case the movable part 12' of the dust catching device 12 is pivoted up around the pivoting axis 21 by the forces exerted by the profiled workpiece. The pivoting axis 21 need not be made as a physically continuous axle, but it can be formed, for example, also by two bearing points or journals.

To make sure that the movable part 12' of the dust catching device 12 rests flush on the workpiece 19, which would be ensured by the force of gravity for relatively smooth support, the movable part of the dust catching device 12 is preferably pressed by means of spring force toward its lowermost position, therefore in the direction toward the workpiece 19. In the preferred embodiments as shown in FIGS. 2 to 5, this force is implemented by a pre-tensioned torsion spring 22 which is located about the pivoting axis 21 and which applies a torque to the movable part 12' of the dust catching device 12 which is opposite to the action of the torque originating from the workpiece 19. An adjustable stop 23, which is shown schematically in FIG. 2 and which is arranged to be adjusted and fixed on the stationary part of the dust catching device 12, acts as a barrier to the pivoting motion of the movable part 12' of the dust catching device 12. Thus, the adjustable stop 23 prevents uncontrolled and undesirably wide pivoting of the movable part of the dust catching device 12. Similar approaches can, of course, also be applied to the other embodiments.

FIG. 3 shows the air intake side view of the preferred embodiment of a dust catching device 12 as shown in FIG. 2 with the difference that, in this preferred embodiment, the part of the dust inlet side 15 which can be pivoted around axis 21, which is made as a threaded rod 24, can be fixed in any position by tightening the wing nuts 25 which can be screwed on the threaded rod 24 which forms the pivot axis 21. By pressing the side walls of the stationary part 12" against the side parts of the movable part 12' of the dust catching device 12, the pivoting motion is inhibited and the parts which can move relative to one another in the normal state are fixed in any relative angular position.

The embodiments shown in FIGS. 2 & 3 are characterized in that the pivoting part 12' of the dust catching device 12 pivots into the stationary part 12" of the dust catching device 12; this is possible in the illustrated case since the width of the dust catching device 12, which is made channel-shaped, allows pivoting into the wall without significantly influencing the air flow within the dust catching device 12.

Figure 4:
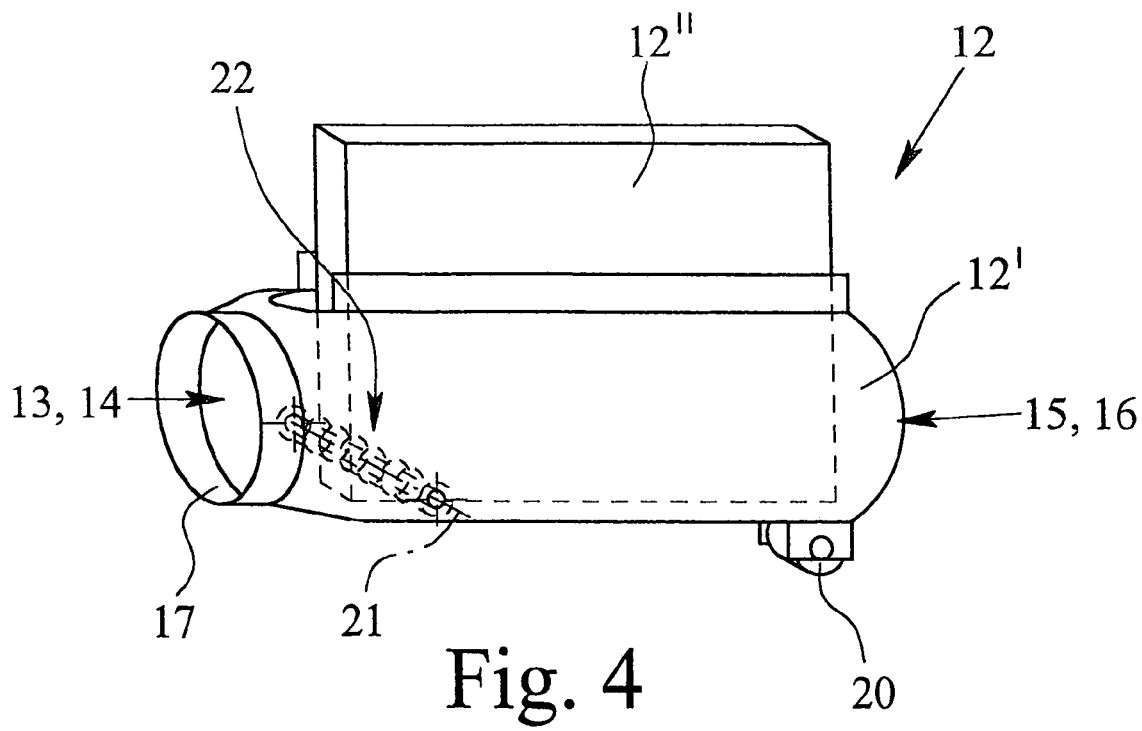
FIG. 4 shows a perspective of another dust catching device in accordance with the invention.
Figure 5:
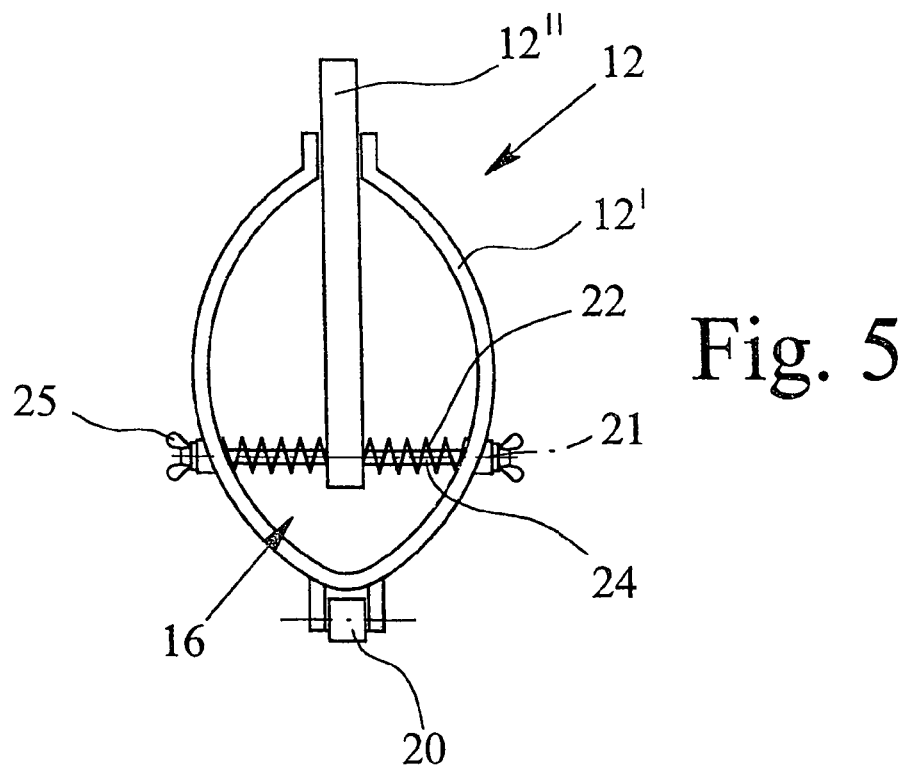
FIG. 5 is a schematic side view of a dust catching device of FIG. 4 in the direction toward the dust inlet side.

However, constructions are also possible as are shown in the preferred embodiment as shown in FIGS. 4 & 5. In this case, the dust catching device 12 has a large movable part 12' which is pivotally supported and is made as a tubular channel. In the pivoted-in state, the movable part 12' encloses the stationary part 12" of the dust catching device 1. In particular, in this embodiment, the dust inlet side 15 can preferably be made funnel-shaped in order to advantageously influence the dust catching action.

What is claimed is:

1. Cutting saw, comprising:
    a carrier which forms a workpiece supporting surface,
    a holder which is mounted on the carrier,
    a saw assembly which is pivotably attached to the holder and is pivotable around a transverse axis above the carrier, the saw assembly having a drive motor and a saw blade, and being pivotable between a rest position in which the saw blade is raised and a sawing position in which the saw blade is lowered, and
    a dust catching device which is mounted on the saw assembly, the dust catching device having at least one dust outlet opening on a dust outlet side and having at least one dust inlet opening on a dust inlet side, the at least one dust inlet opening facing a dust-throwing side of the saw blade,
    wherein at least part of the dust catching device is movable on at least the dust inlet side;
    wherein the movable part of the dust catching device is arranged on a stationary part so as to pivot around a pivot axis, and wherein the dust inlet opening is formed by an end of the movable part which is away from the pivoting axis together with a corresponding end of the stationary part;
    wherein the movable part of the dust catching device, with the saw blade in the sawing position, is positioned with the dust inlet opening at least near a surface of the workpiece;
    wherein the movable part of the dust catching device has at least one sliding or rolling element on the dust inlet side, and
    wherein the sliding or rolling element is adapted to position the dust inlet side of the dust catching device on the workpiece in the sawing position of the sawing assembly.

2. Cutting saw as claimed in claim 1, wherein the movable part of the dust catching device is movable essentially in a spatial plane which is defined by the saw blade.

3. Cutting saw as claimed in claim 1, wherein the movable part of the dust catching device rests on the workpiece with the saw blade in the sawing position.

4. Cutting saw as claimed in claim 1, wherein the movable part of the dust catching device is adapted to follow the contour of the workpiece during relative motion between the saw blade and the workpiece.

5. Cutting saw as claimed in claim 1, wherein means are provided for setting a maximum deflection position of the movable part of the dust catching device.

6. Cutting saw as claimed in claim 1, wherein the sliding or rolling element is adapted to slide or roll on the workpiece.

7. Cutting saw as claimed in claim 1, wherein one of the movable part and the stationary part is essentially surrounded by the other of the stationary part and the movable part of the dust catching device in a pivoted-in position of the movable part.

8. Cutting saw as claimed in claim 1, wherein the pivot axis comprises a threaded rod with wing nuts threaded onto opposite two ends thereof.

9. Cutting saw as claimed in claim 1, wherein the movable part of the dust catching device is pre-tensioned into a pivoted-out position by a spring element.

10. Cutting saw as claimed in claim 1, wherein the movable part of the dust catching device is funnel-shaped.

* * * * *